UNITED STATES PATENT OFFICE.

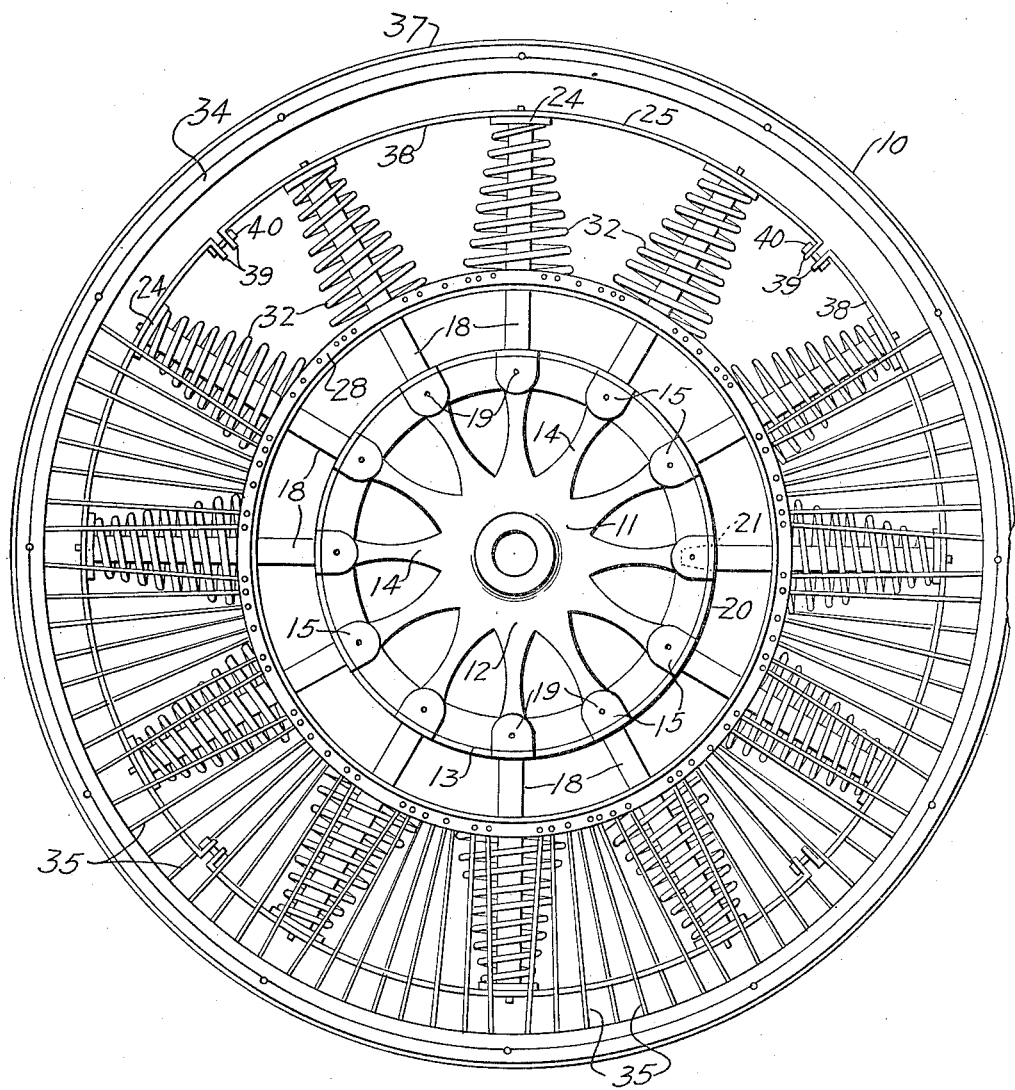

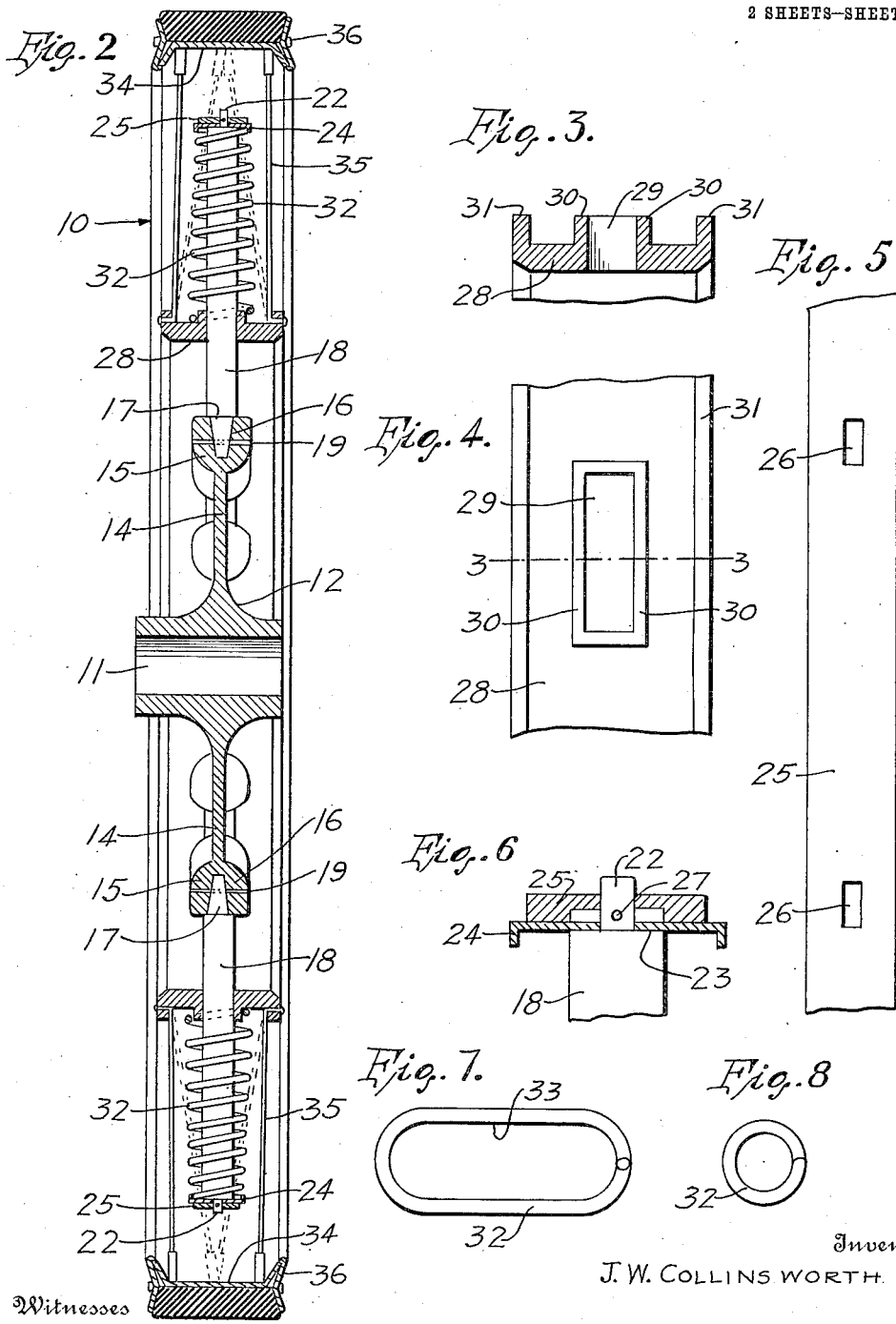

JOHN W. COLLINSWORTH, OF LEARY, TEXAS.

WHEEL.

1,082,151.  Specification of Letters Patent.  Patented Dec. 23, 1913.

Application filed April 16, 1913. Serial No. 761,523.

*To all whom it may concern:*

Be it known that I, JOHN W. COLLINSWORTH, a citizen of the United States, residing at Leary, in the county of Bowie and State of Texas, have invented certain new and useful Improvements in Wheels, of which the following is a specification, reference being had to the accompanying drawings.

This invention relates to new and useful improvements in wheels, and more particularly to that class known under the title of spring wheels.

An object of this invention is the provision of a wheel which is of such construction as to give sufficient spring to the body of a vehicle, without necessitating the employment of pneumatic tires.

A further object of this invention is the provision of a spring wheel which will be comparatively simple and inexpensive to manufacture, reliable and efficient in use, and readily operated.

With the above and other objects in view, this invention resides in the novel features of construction, formations, combinations and arrangements of parts to be hereinafter more particularly described, claimed and illustrated in the accompanying drawings, in which—

Figure 1 is a side elevation of a spring wheel embodying the improvements of my invention. Fig. 2 is a transverse diametrical section thereof. Fig. 3 is a detail sectional view on the line 3—3, of Fig. 4. Fig. 4 is a fragmentary plan view of the inner rim. Fig. 5 is a fragmentary view of a band hereinafter referred to. Fig. 6 is a detail sectional view through one of the spoke caps. Fig. 7 is a detail view of one of the springs employed, and, Fig. 8 is another view of a spring.

Referring to similar parts in the accompanying drawings by similar characters of reference, the numeral 10 designates generally my improved spring wheel which consists of a hub 11 comprising inner and outer sections 12 and 13, which are connected by the radial spokes 14. The outer section 13 of the hub 11 is provided with a plurality of enlargements 15, which are formed with sockets 16 to receive the wedge-shaped extremities 17 of the main spokes 18, which are held rigid relative to the hub 11 by the pins 19 which pass through the enlargements 15 and the before described tapered extensions 16.

A ring 20 engages the periphery of the outer section 13 of the hub 11 and is formed with a plurality of openings 21 to permit the passage therethrough of the main spokes 18. The outer terminals of these spokes 18 are reduced to produce shanks 22, and resultant shoulders 23, as clearly shown in the drawings. Caps 24 are disposed upon these shanks 22 and contact with the shoulders 23. These caps 24 are held against displacement by a band 25 which is formed with a plurality of openings 26 adapted to receive the before described shanks 22. Pins 27 are extended through the shanks 22 and engage the outer sides of the caps 24, for further holding the latter against displacement from the spokes 18.

The numeral 28 designates a ring which is formed with a plurality of openings 29 adapted to receive the spokes 18. This ring 28 is provided around the openings 29 with reinforcing flanges 30, while formed upon the outer edges of the ring 28 are parallel flanges 31.

Springs 32 surround the spokes 18 between the caps 24 and the ring 28, the said springs tapering toward their outer extremities, while the inner extremities of the springs 32 are flattened, as at 33, to surround the flanges 30 which holds the springs against displacement.

The rim of the tire which is indicated by the numeral 34 is attached to the flanges 31 of the ring 28 by supplemental spokes 35, which holds the rim 34 rigid upon the ring 28. The rim 34 is provided with any suitable locking means such as indicated at 36, for the purpose of holding the tire 37 thereon.

The opposite ends of the springs 32 are secured respectively to the caps 24 and the ring 38 so that when weight is pressed upon the hub of the wheel, these springs will resiliently support the rim 34 relative to the hub 11.

In order that the ring 25 can be conveniently placed upon the shoulders 23 of the spokes 18, this said ring 25 is formed from a plurality of segmental sections 38 formed with laterally directed ends 39 adapted for the reception of fastening devices 40.

It should be understood in this connection that various minor changes in the specific details of construction can be resorted to within the scope of the appended claims, without departing from or sacrificing any of the advantages of the invention.

From the foregoing disclosures, it will be manifest that a resilient wheel is provided which will fulfil all of the necessary requirements of such a device.

Having thus fully described this invention what I claim as new and desire to protect by Letters Patent is:

1. A resilient wheel comprising a hub and a rim, spokes extending from the hub, a ring slidable upon the inner ends of said spokes, a second ring connected to the outer ends of said spokes, the first mentioned ring having openings therein to receive the spokes and outstanding flanges adjacent said openings, springs surrounding the spokes and engaging said rings at their opposite ends, the inner ends of said springs surrounding said flanges, and supplemental spokes rigidly connecting said rim and the first mentioned ring, as and for the purpose described.

2. In a resilient wheel the combination with a hub and a rim, spokes detachably secured to the hub, a ring slidable upon the spokes, said ring having openings therein to receive the spokes, flanges formed upon the ring adjacent the openings, caps disposed upon the outer ends of the spokes, a sectional ring connecting the spokes and engaging the caps, supplemental spokes connecting the ring rigidly to the rim, and springs surrounding the spokes and engaging the caps and the flanges formed upon the first mentioned ring.

In testimony whereof I hereunto affix my signature in the presence of two witnesses.

JOHN W. COLLINSWORTH.

Witnesses:
F. B. COILSEN,
W. S. THOMAS.

---

Copies of this patent may be obtained for five cents each, by addressing the "Commissioner of Patents, Washington, D. C."